United States Patent Office.

ANTHONY SEABOLD, OF FLORENCE, OHIO.

Letters Patent No. 113,456, dated April 4, 1871.

IMPROVEMENT IN CORN-SALVES.

The Schedule referred to in these Letters Patent and making part of the same.

*To all whom it may concern:*

Be it known that I, ANTHONY SEABOLD, of Florence, Erie county, State of Ohio, have invented a new and improved Corn-Salve; and I do hereby declare the following to be a full, clear, and exact description of the same.

It is well known that corns upon the feet and toes are hard horn-like excrescences or indurations of the skin, and are exceedingly troublesome and painful.

Various means have been resorted to for their cure, but in the majority of instances temporary relief only is afforded.

The cause of this is to be found in the method of treatment, which almost invariably consists in cutting out the corn with a sharp instrument, or in forcing it out by the compression of the surrounding flesh, so that the corn shall project sufficiently to be gradually scraped or pared off.

These methods do not effectually remove the corn, as certain portions remain in the flesh, which, after a time, develop and become as troublesome and painful as the first.

The cutting and paring must, therefore, be continued from time to time, as the seat of the disease is not reached nor its causes removed.

My invention consists in the employment of a salve composed of the ingredients hereinafter named, which when applied to the corn enters it, and extending to the roots or base removes its hardness and restores it to the condition of the surrounding flesh and skin.

The corn is not cut off, but is softened and gradually disappears, leaving the skin smooth and pliable.

In the composition of my improved salve I employ the following ingredients in about the proportions specified, although these proportions may be varied if found desirable:

Muriate of ammonia, two parts; verdigris, three parts; quitter oil, one part; beeswax, two parts; lard, two parts.

The lard and beeswax are first melted together in a suitable vessel; the quitter oil is then added, and the whole mass stirred until the parts are thoroughly incorporated. When this takes place I stir in the muriate of ammonia, and lastly add the verdigris.

The compound is allowed to boil once or twice to insure the proper admixture of the parts, when it is removed and put into suitable boxes or bottles for use.

In applying it to a corn the salve is first spread upon a strip of cloth and secured to the affected parts in any suitable manner.

My improved salve, instead of eating into the corn, as is the case where strong acids are used, and thus produce a painful sore, softens and gradually dispels the parts without producing the slightest soreness or creating any unpleasant sensation.

It is, moreover, effectual and permanent in its cure, as it reaches and removes the cause of the continued disease.

It may also with equal effect be applied to bunions and chilblains.

Having thus described my invention,

What I claim as new therein, and desire to secure by Letters Patent, is—

The corn-salve, composed of the ingredients compounded in the manner and by the process substantially as herein described.

ANTHONY SEABOLD.

Witnesses:
N. K. ELLSWORTH,
E. A. ELLSWORTH.